July 9, 1957

A. D. BAKER ET AL 2,798,906

INDICATOR SWITCH

Filed March 19, 1953

INVENTORS
ALBERT D. BAKER
BY WILLIAM E. BROWN their ATTORNEYS

INVENTORS
ALBERT D. BAKER
BY WILLIAM E. BROWN

*their* ATTORNEYS

United States Patent Office

2,798,906
Patented July 9, 1957

1

2,798,906

INDICATOR SWITCH

Albert D. Baker, Lansing, Mich., and William E. Brown, Anderson, Ind., assignors to General Motors Corporation, Detroit, Mich., a corporation of Delaware Application March 19, 1953, Serial No. 343,394

7 Claims. (Cl. 200—11)

This invention relates to signal circuit switches and has for an object to provide for maximum of circuit indications controlled by a minimum of circuit connections. It is also desired to prevent erroneous circuit indications or to prevent circuit indications prior to their actual accomplishment, when the indicator switch is driven in response to a selective manual operator.

With automatic transmissions for automobiles, it is desired to indicate the actual driving range at which the automatic transmission is adjusted for all conditions or regimes of automobile operation. It is needful to accurately indicate the condition of the transmission arrangement irrespective of the actual or indicated position of a manual selecting lever. This is particularly so with respect to the driving ranges of "low speed" and "reverse." In some cases, when a shift from "low" to "reverse" is being accomplished, there is a point where the transmission itself will actually shift to the "reverse" position well in advance of the reverse detent position. In like manner, there is a point between "low" and "reverse" shift detent positions where the indicating switch will cause the shift indicator to change its reading from "low" to "reverse."

It is very difficult, and sometimes impossible, to correlate the point where the transmission shifts and a point where the indicator unit changes. There is a safety hazard, therefore, in the fact of the transmission being in one condition or regime while the indicator thereof displays the opposite situation. That is, there is a danger that the transmission may be in a "reverse" position while the indicator is indicating "low" position. That is possible due to incomplete movement of the shift lever to some point between the detent positions, as in partially moving from "low" to "reverse." The indication may be at one regime while the transmission is actually set up for reversed condition, i. e., in the opposite gear relation than that indicated. The same problem is involved in shifting from "reverse" to "low."

A rotary switch provides a terminal body in which circuit terminals accessible from the outside connect with the devices to be actuated and the indicating mechanism, while providing circuit terminals or switch contacts selectively engageable to conform with the circuits being established. The contacts for the indicator circuits are so spaced and are associated with a contactor of such form that either single indicator contacts may be connected with a source contact or, so that adjacent ones of the indicator contacts can be connected in pairs whereby, for example, a group of three indicator contacts may be connected to give an indication of five indicator positions. The contactor is rotatably supported so as to be rockable for disengagement with the source contact and thereby open the indicator circuits at predetermined points of contactor movement.

The objection is circumvented by using a switch in which the hot feeding circuit is broken completely over a sufficient range between the "low" and "reverse" positions so that no shift position will be indicated in that range, and so that the switch will always cause the proper shift position indication to occur when the transmission is in or near either "low" or "reverse" shift position.

Further objects and advantages of the present invention will be apparent from the following description, reference being had to the accompanying drawings, wherein a preferred embodiment of the present invention is clearly shown.

Figure 1:
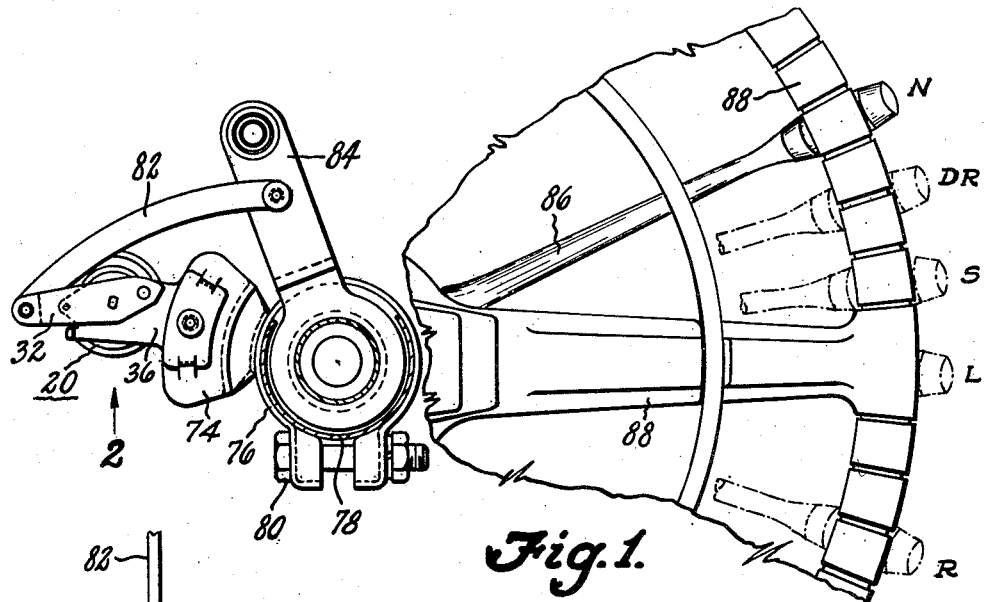
Fig. 1 is a plan view of a selector mechanism, such as the drive range of an automobile, with connecting means for actuating an indicator switch.

With particular reference to the drawings, first with respect to Figs. 3, and 6–8 inclusive, the numerals 1, 2, 3, 4, 5, 6 and 7 refer to circuit terminals of an indicator switch 20 that provides a switch-back or terminal block 10. The circuit terminals 1–7 are extended through the terminal block 10 to provide switch contact faces 11, 12, 13, 14, 15, 16 and 17, respectively, arranged in a concentric row about a central current source contact 18. Of those contact faces, 11, 12 and 13, will be referred to as indication circuit contacts, while contacts, 14, 15 and 16, will be referred to as signal circuit contacts. The central contact 18 connects by a strap 9 with the circuit terminal contact 7 which, in turn, connects with the switch contact 17, the terminal 7 being connected with the electrical source, such as a battery.

Figure 2:
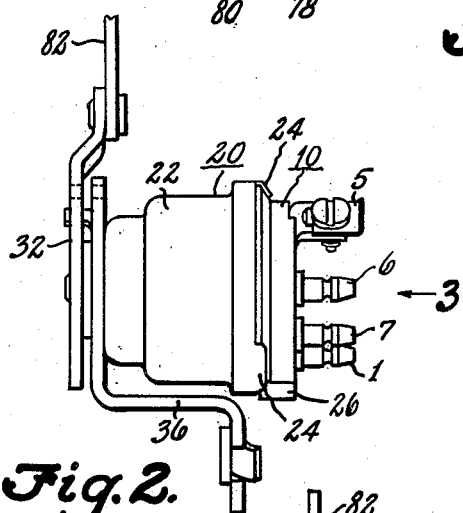
Fig. 2 is an enlarged view in elevation of the indicator switch substantially as indicated by the arrow to of Fig. 1.
Figure 3:
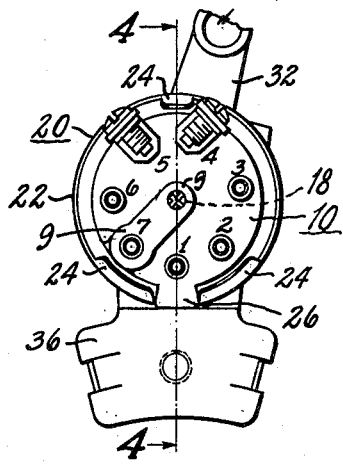
Fig. 3 is a bottom view of the indicator switch substantially as indicated by the arrow 3 of Fig. 2.
Figure 4:
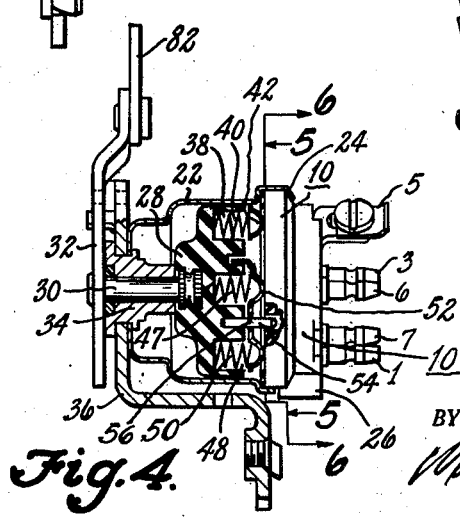
Fig. 4 is a longitudinal sectional view through the indicator switch as indicated by the line and arrow 4—4 of Fig. 3.

As shown in Figs. 2, 3 and 4, the terminal block 10 for the indicator switch 20 is mounted in the open end of a cup-like housing 22 where it is retained by tongues 24 bent against the edge of the terminal block 10 and so as to embrace both sides of a lug 26. Rotatable in the housing 22, there is a contact carrier 28 provided with an operating shaft 30 attached to an arm 32. The shaft 30 is journaled in a bushing 34 supported by a bracket 36.

Figure 5:
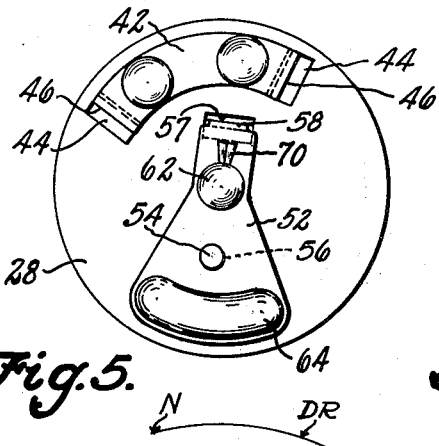
Fig. 5 is an enlarged plan view of the contactors and contact carrier substantially as indicated by the line and arrow 5—5 of Fig. 4.

The contact carrier 28 has recesses 38 therein in which springs 40 are positioned. These springs exert a pressure on a contact member 42 to hold such member against the face of the terminal block 10. The contact carrier 28 also has recesses 44 formed therein, as shown in Fig. 5, and bent over ends 46 of the contact 42 extend into these recesses when the contact is positioned on the carrier so that rotation of the carrier will effect rotary movement of the contact. The carrier also has a central recess in which a spring 47 is received and a pair of recesses 48, one of which is shown in Fig. 4, in which are positioned springs 50. The springs 48 and 50 press a triangular contact member 52 against the face of the terminal block when the parts are assembled as seen in Fig. 4, to effect engagement of the contact 52 with the current source contact 18 and one or more of the contacts 11, 12 and 13, depending upon the rotative position of the contact 52.

The contact carrier 28 supports a pin 54 which passes through a hole 56 in the contact 52 and the contact carrier also has a recess 57 into which a tongue 58 extending from the contact 52 projects. The pin 54 and tongue 58 form an operating connection between the contact 52 and the contact carrier 28, so that when the latter is rotated the contact 52 will also be rotated. The contact surface 62 is in alignment with contact 18 of the terminal block in all rotative positions of the contact 52 and is generally in engagement therewith, but under certain circumstances is disengaged therefrom, as will be described later. The contact 52 has an arcuate contact surface 64 near its outer end which is so positioned that it will move over indicator contacts 11, 12 and 13 upon rotation of the shaft 30 and contact carrier 28.

Figures 9, 10, 11:
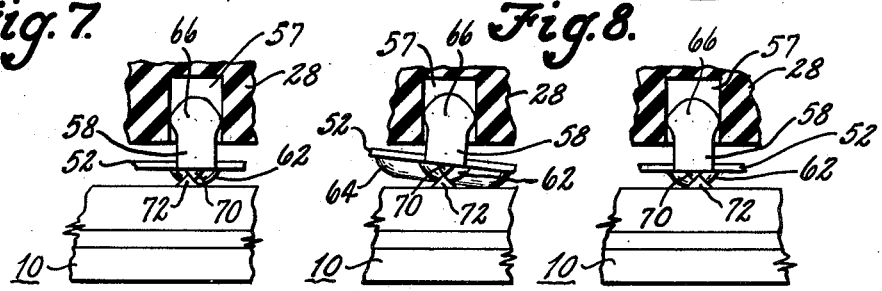
Figs. 9, 10 and 11 are enlarged views illustrating details of operation.

The contact 52 fits loosely enough on the pin 54 to be rockable thereon and, as shown in Figs. 9, 10 and 11, the tongue 58 on contact 52 has an enlarged or bulbous type head, only the edges of which engage the sides of recess 57 of the carrier 28. Therefore, when the contact is rotated by the carrier the contact may wobble or tilt with respect to the face of the terminal block 10, as shown in Fig. 10. This wobbling of the contact 52 is possible because it is held against the face of the block 10 and the several contacts thereon by resilient means rather than a rigid connection.

Means are provided for positively rocking the contact 52 at a predetermined point in its rotative movement. The face of the contact adjacent the terminal block 10 has a rib or ridge 70 which, when the contact is rotated to a predetermined position, will engage a cam or the like which is formed on the face of the terminal block 10. As shown in Fig. 9, rotation of the contact 52 will engage rib 70 with the cam 72 and further rotation of the contact will cause it to be tilted as the rib 70 on the contact passes over cam 72 on block 10, as shown in Fig. 10.

When the contact 52 is tilted or rocked as described the contact face 62 is raised out of engagement with current source contact 18. Also, the arcuate contact 64 is raised at one end and disengaged from one of the indicator circuit contacts. As further rotation takes place, the rib 70 passes the crest or high point of the cam 72 and the contact 52 slides down the incline to assume its flat engagement with the contact faces of the terminal body 10. During this movement, when the contact 52 has been disengaged from the source contact 18 the indicator circuit established has been positively opened. There is, therefore, an interval of switch movement at which no signal indication will be given.

The indicating switch so constituted is mounted as shown in Fig. 1, where the bracket 36, supporting the switch 20, is attached to a web or wing 74 that has a clamp band 76 circumscribing a steering post 78 of an automobile, where it is held in adjusted relation by the screw device 80. The switch arm 32 is connected by a link 82 with an actuator arm 84 rotatable within the steering column or post 78. The arm 84 is rigidly connected with a hand lever 86 associated with a steering wheel 88. The hand lever 86 is connected with a gear selecting transmission, not shown, but is movable throughout the range of positions indicated to the right of Fig. 1, and includes a position N for neutral, shown in solid lines, a position DR for driving range, a position S for super-drive, a position L for low speed and a position R for reverse. As the hand lever 86 is moved from one to another of these positions it moves the transmission to the various regimes of operation, the arm 84 also rotates and through its link 82 to the switch arm 32 rotates the contact carrier 28 to like positions shown in Figs. 6–8, inclusive. In Fig. 7, the various positions are similarly indicated along an arc concentric with the source contact 18.

Figure 6:
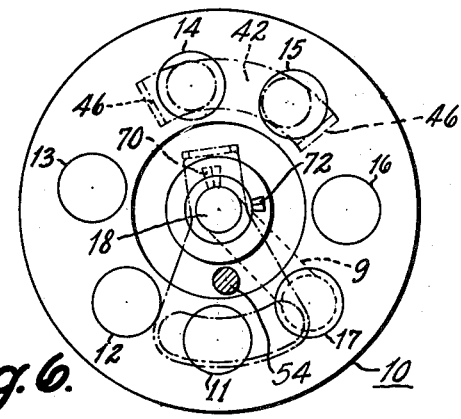
Fig. 6 is an enlarged plan view of a terminal block substantially as indicated by the line and arrow 6—6 of Fig. 4.
Figure 7:
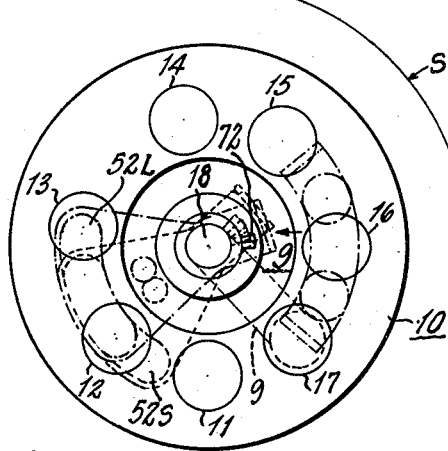
Figs. 7 and 8 are similar views illustrating contactors moved to different positions.

Rotation of the contact carrier 28 moves the contact 52 over the surfaces of the indication contacts in such manner that the contact surface 64 successively engages the contacts 11, 12 and 13 and includes a position, as shown in Fig. 6, where the contact 64 engages the contact face 11 when the hand lever 86 is in the position N for safety or neutral position. The contact 18 being connected with the battery, by strap 9 and the terminal 7, and the contact 11 being connected with the indicator, it will display to the driver the neutral condition of the gear transmission. The contact 42 will be in position to bridge the contacts 14 and 15 which connect a safety device to the battery, making it possible to start the engine. Rotating the hand lever 86 to the drive position DR, rotates the contact 52 to a position where surface 64 bridges the indicator contacts 11 and 12 which are then both connected to the battery through the contact 52. No circuit is completed by the contact 42. In like manner, moving the hand lever 86 to the position S moves the contact 52 to the position shown in Fig. 7 where the surface 64 engages the indicator contact 12 only. That position of the contact 52 is indicated by the dashed lines 52s and further movement of the hand lever 86 to the low position L moves the contact 52 to position 52L shown by dot-dash lines in Fig. 7, in which case both of the contacts 12 and 13 are bridged by the surface 64, and connected with the battery. It will be noted that in the movement of this contact 52 from the position shown in Fig. 6 to that shown in Fig. 8, there are occasions when the surface 64 engages the indicator contact 12 before it leaves contact 11, and also engages contact 13 before it leaves contact 12. Thus, the circuit indication involves not only engagement of single contacts of a series but adjacent contacts in combination. Thus, a condition of gear connection is indicated before the detent position of the lever 86 may be accomplished. This is particularly noticeable when shifting from the low drive relation L to the reverse drive relation R. The low drive relation is indicated when the rib 64 connects both contacts 12 and 13 with the battery, and the reverse drive relation when the surface 64 engages the contact 13 alone.

Figure 8:
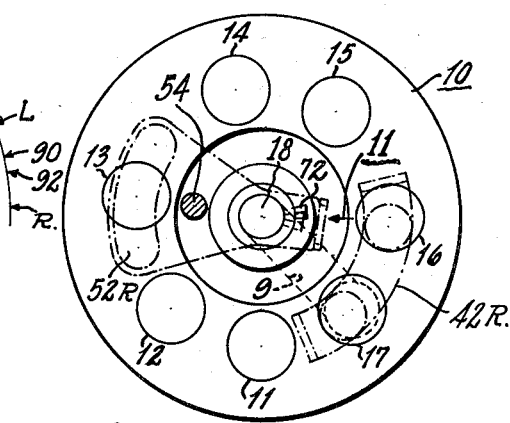

In this shift of drive relation, the transmission actually shifts to the reverse condition in advance of the contact 52 being moved to the reverse detent position which is shown in Fig. 8. That point of transmission shift may occur at a point 90, while the contact 52 is in a position that will engage both contacts 12 and 13. If the hand lever 86 stops part way between the positions L and R, there may be a condition in which the transmission is actually in reverse while the indication is for low speed. That might establish a dangerous condition for the driver. Similarly, in moving from a reverse position to low position, the transmission might change at a point 92 before the detent position L is assumed. That is to say, the transmission might be set for low speed while the indicator is still displaying a reverse condition because the contactor would engage only the contact 13.

Here, the erroneous indication is eliminated by providing the rib 70 on the contact 52 and the cam 72 on the terminal block 10. As shown in Figs. 6, 7 and 8, these elements are so disposed that when the contact 52 is moved from the position 52–L of Fig. 7 to the position 52–R in Fig. 8, the contact 52 will be lifted and rocked as indicated by the showing of Figs. 9, 10 and 11. Before the contact 52 reaches the position for reverse, it is raised sufficiently to disengage the contact 62 from the source contact 18, which opens the indicator signal circuit completely. This is indicated in Fig. 10. The contact 52 is also rocked about the radius of the contact to lift one end of the contact rib 64 as indicated in Fig. 10. As a result, there is a point between the detent positions for low and reverse when no indication will be given in the instrument cluster on the dashboard. When the contact 52 reaches the detent position, which is reached after the rib 70 traverses the cam 72, the contact 52 will again settle against the terminal block 10 to engage only the indicator contact 13, showing the driver that the reverse drive regime is completely established.

While the embodiment of the present invention as herein disclosed, constitutes a preferred form, it is to be understood that other forms might be adopted.

What is claimed is as follows:

1. In an indicator switch for controlling a plurality of indicator circuits, a terminal block providing a source terminal and a concentric group of circuit terminals spaced from the source terminal and relatively close together, a contact normally engaging the source terminal and adapted to be moved into position to engage the circuit terminals individually or two adjacent contacts, rotatable means for moving said movable contact into engagement with said fixed contacts successively, and cam means for disengaging the said movable contact from the source contact in a predetermined position of the contact only.

2. In an electric switch, a movable contact carrier, a movable contact operated thereby, said contact comprising a triangular body having contacting surfaces extending from the body of the contact, a right angle tongue extending from the opposite side of said contact and having a bulbous-type head engageable in a recess formed in the contact carrier, said carrier having a pin projecting from and engaging an opening formed in the movable contact, whereby the contact is operated by movement of the contact carrier.

3. In an electric switch, a terminal block having a plurality of contact faces including a current source contact, a group of signal circuit contacts and a group of indication circuit contacts, contacts of said groups being positioned relatively close together, a movable contact for connecting the current source contact with the indicator circuit contacts individually or with any two adjacent contacts, a contact carrier for moving the movable contact, cooperating means on the movable contact and the terminal block operable to disengage the movable contact from the current source contact, said means being effective at one position and upon movement of the movable contact from a position connecting a pair of said indicator contacts with the current source contact to a position for connecting only one of said indicator contacts with the current source contact.

4. In an electric switch, a terminal block having a plurality of fixed contacts circumferentially spaced about a current source contact, a movable contact carrier, a contact supported on said carrier and having a single contact engageable with the current source contact and an arcuate ribbed contact engageable with the circumferentially spaced contacts either individually or in adjacent pairs, whereby one individual contact may be connected with the current source contact before an adjacent indicator contact is disconnected from said source contact, and means operative to disconnect the movable contact from the current source contact when said movable contact is moved from a position connecting two of said indicator contacts to a position connecting only one of said indicator contacts, and vice versa.

5. In an electric switch, a terminal block having a current source contact and a concentric group of indicator contacts spaced therefrom and supported by the terminal block, a movable contact normally engageable with the current source contact and movable to connect it with the indicator circuit contacts, said movable contact having a ribbed contact face engageable with the indicator contacts either singly or in adjacent pairs, a cam on the terminal block engageable by a cooperating cam formed on the movable contact upon movement thereof from one indicator circuit contact to another for momentarily disconnecting the movable contact from said current source contact when moving to a predetermined position.

6. In an indicator switch, the combination comprising; a terminal block providing a plurality of fixed contacts and a source contact, a shaft, a contact carrier rotatable by the shaft relative to the block, a floating contact member resiliently carried on the carrier and arranged to simultaneously engage said source contact and at least two adjacent contacts of said fixed contacts, and means on said block and member for tilting said member when the carrier is in a predetermined position relative to the block for causing the member to engage only one of the two adjacent fixed contacts and to move out of engagement with the source contact.

7. In an indicator switch, the combination comprising; a terminal block having a plurality of fixed contacts and a source contact, a shaft, a contact carrier rotatable by the shaft relative to the block, a floating contact member resiliently carried on the carrier and arranged to simultaneously engage at least one of the fixed contacts and said source contact, and means on said block and member for tilting the member when the carrier is in a predetermined position relative to the block for causing the member to move out of engagement with said source contact and at least one of the fixed contacts.

References Cited in the file of this patent

UNITED STATES PATENTS

| 1,838,983 | Angell | Dec. 29, 1931 |
| 1,890,721 | Currier | Dec. 13, 1932 |
| 1,900,236 | Hall | Mar. 7, 1933 |
| 2,291,249 | Nielsen | July 28, 1942 |
| 2,393,184 | Passow | Jan. 15, 1946 |
| 2,475,300 | Webb | July 5, 1949 |
| 2,511,069 | Lawson et al. | June 13, 1950 |
| 2,666,101 | Ellithorpe | Jan. 12, 1954 |

FOREIGN PATENTS

| 605,675 | Great Britain | July 28, 1948 |